ically by mutually complemen-
United States Patent [19]

Melindo

[11] 4,287,392
[45] Sep. 1, 1981

[54] INTEGRATED CIRCUITRY FOR EXCHANGING SIGNALS BETWEEN TELEPHONE STATION AND CENTRAL OFFICE

[75] Inventor: Flavio Melindo, Torino, Italy

[73] Assignee: CSELT - Centro Studi e Laboratori Telecomunicazioni S.p.A., Torino, Italy

[21] Appl. No.: 43,848

[22] Filed: May 30, 1979

[30] Foreign Application Priority Data

Jun. 2, 1978 [IT] Italy .............................. 68269 A/78

[51] Int. Cl.³ .............................................. H04M 3/22
[52] U.S. Cl. ........................... 179/16 AA; 179/18 FA; 179/70; 179/170 NC
[58] Field of Search ........... 179/16 AA, 18 F, 18 FA, 179/16 F, 70, 77, 170 R, 170 NC, 2 C

[56] References Cited

U.S. PATENT DOCUMENTS

| | | | |
|---|---|---|---|
| 3,410,961 | 11/1968 | Slana | 179/18 FA |
| 3,783,194 | 1/1974 | Couch | 179/16 AA |
| 3,848,094 | 11/1974 | Russell | 179/18 FA |
| 3,914,556 | 10/1975 | Frazee | 179/18 F |
| 4,086,447 | 4/1978 | Schindler et al. | 179/170 NC |
| 4,087,646 | 5/1978 | Brolin et al. | 179/18 FA |
| 4,088,843 | 5/1978 | Rogers et al. | 179/70 |
| 4,142,075 | 2/1979 | Olschewski | 179/16 F |
| 4,228,323 | 10/1980 | Feiner et al. | 179/170 R |

FOREIGN PATENT DOCUMENTS

2551816 6/1976 Fed. Rep. of Germany ............. 179/77

OTHER PUBLICATIONS

A. R. Potter & N. T. Thurlow, "Coding and Signal Interfacing for a Digital Local Exchange", Post Office Research Center, 1976.
H. Schindler & P. Vettiger, "Optocoupler-Based Extension/Subscriber-Line Circuit", IBM Zurich Research Laboratory.
H. Gessler & F. Riolo, "Practical Examples of Signalling Conversion at the Interface between PCM System and Electromechanical Switching Equipment", Hasler Ltd.

*Primary Examiner*—Bernard Konick
*Assistant Examiner*—Randall P. Myers
*Attorney, Agent, or Firm*—Karl F. Ross

[57] ABSTRACT

The two talking wires of a line loop extending from a subscriber station to a central office, provided with respective blocking capacitors, are connected on the subscriber side of these blocking capacitors to respective signal detectors fed from a common battery and cross-coupled by a common compensating capacitor. The two signal detectors receive outgoing signals from the central-office equipment via a common photoelectric coupler and transmit incoming signals to that equipment by way of respective bistable threshold comparators and individal photoelectric couplers. The two signal detectors with their threshold comparators are constituted in integrated circuity by mutually complementary transistors and diodes together with associated resistors.

9 Claims, 2 Drawing Figures

INTEGRATED CIRCUITRY FOR EXCHANGING SIGNALS BETWEEN TELEPHONE STATION AND CENTRAL OFFICE

FIELD OF THE INVENTION

My present invention relates to integrated circuitry serving to exchange signals between a subscriber station of a telephone system and an associated central office.

BACKGROUND OF THE INVENTION

In present-day telephone systems, the subscriber stations are generally energized by a central battery connected across the talking conductors of their respective line loops whereby, upon closure of a line loop by the subscriber's hook switch, a direct current circulates over these conductors to mark the line busy and to convey switching signals such as dial pulses. The switching equipment responding to these signals at the central office is connected to the talking conductors, at points lying on the subscriber side of respective blocking capacitors or transformers, by circuit elements having a low resistance to direct current but a high impedance for alternating current in order to prevent the transmission of voice frequencies between lines supplied by the same battery. The high a-c impedance is normally an inductance which in many instances is constituted by the winding of an associated busy relay.

In contrast to resistances and capacitances, an inductance is not readily realizable in integrated circuitry and must therefore generally be designed as a coil which, aside from occupying considerable space, has to be protected against dust and moisture; such coils, moreover, are relatively expensive on account of the considerable quantity of copper required for them.

Efforts have therefore already been made to replace the conventional line inductances of telephone systems by electronic components of more or less equivalent characteristics. Thus, the use of constant-current generators has been proposed (Zurich Seminar 1976 and 1978, Paper Co. C7) as a means for suppressing current alternations and providing a direct current of a magnitude nearly independent of line length. Drawbacks of this method include the difficulty of obtaining a perfect balance between the current generators connected to the two line conductors as well as their incompatibility with variable-gain electronic telephones in which the intensity of voice-frequency currents is adjusted in response to direct-current magnitude to compensate for differences in line length.

According to another proposal (Zurich Seminar 1976, Paper No. C8), inductances are simulated by integrated circuits comprising two resistors in series. This circuitry is rather complex and consumes considerable power (about 0.6 watt). It also requires the insertion of a small transformer in the line loop to reduce interference by spurious signals of the so-called common-mode type which propagate cophasally along the two line conductor to their common ground return but which are not transmitted to the secondary of that transformer.

A transistor circuit has also been described (Zurich Seminar 1976, Paper No. C7) which simulates a busy relay as concerns response to line current and inductive behavior. Such a circuit, however, has a nonlinear voltage/current characteristic especially in the low-voltage range and is sensitive to current reductions and noise pulses which may be misinterpreted as switching signals.

OBJECTS OF THE INVENTION

The general object of my present invention, therefore, is to provide improved integrated circuitry for the transmission of signals between a subscriber station and central-office equipment with avoidance of the above-discussed inconveniences.

A more particular object is to provide circuitry of this description which is readily adaptable to modifications in subscribers' telephone apparatus yet can be easily substituted for conventional circuit components in existing central offices.

It is also an object of my invention to provide signal-transmitting circuitry for the purpose set forth which has a low impedance for cophasal signals of the common-mode type for effectively shunting these signals to ground ahead of a pair of blocking capacitors serving to transmit the voice currents between the associated subscriber station and another station communicating therewith.

SUMMARY OF THE INVENTION

I realize these objects, in accordance with my present invention, by providing two signal-detecting networks connected between respective talking conductors and respective terminals of a direct-current source, such as the usual central battery, together with two threshold comparators connected to these networks for translating line-voltage changes of predetermined minimum magnitudes into incoming d-c signals detectable by the switching equipment of the central office, the networks as well as the comparators being respectively constituted by sets of first and second integrated-circuit components. A common capacitor connected between the two networks compensates voice-frequency currents propagating in opposite directions over the talking conductors, thereby providing a high network impedance for such currents. A common biasing circuit for two semiconductor elements of these networks includes a light-responsive device juxtaposed with a light-emitting device controlled by the switching equipment to translate outgoing d-c signals into voltage changes on the talking conductors which are detectable at the subscriber station; the incoming signals generated by the threshold comparators are transmitted by individual coupler circuits from these comparators to the switching equipment.

Advantageously, pursuant to a more particular feature of my invention, the individual coupler circuits referred to are also constituted by photoelectric couplers galvanically separating the line loop and its signal-transmitting circuitry from the central-office equipment responding to the incoming d-c signals.

In a preferred embodiment more fully described hereinafter, the integrated-circuit components of the two signal-detecting networks as well as of the associated threshold comparators are symmetrically disposed with reference to the talking conductors and include mutually complementary transistors. Each comparator may include a pair of such transistors interconnected in a bistable circuit which establishes a certain hysteresis with distinct thresholds for saturation and desaturation. These two transistors are advantageously of opposite conductivity types, as are two other transistors which form part of the associated signal-detecting network and which include a first transistor with an input electrode (base) connected to the common capacitor and a second transistor in series with a voltage divider having a tap connected to the threshold comparator, this latter transistor constituting the semiconductor element biased by the light-responsive device.

BRIEF DESCRIPTION OF THE DRAWING

The above and other features of my invention will now be described in detail with reference to the accompanying drawing in which.

SPECIFIC DESCRIPTION

Figure 1:
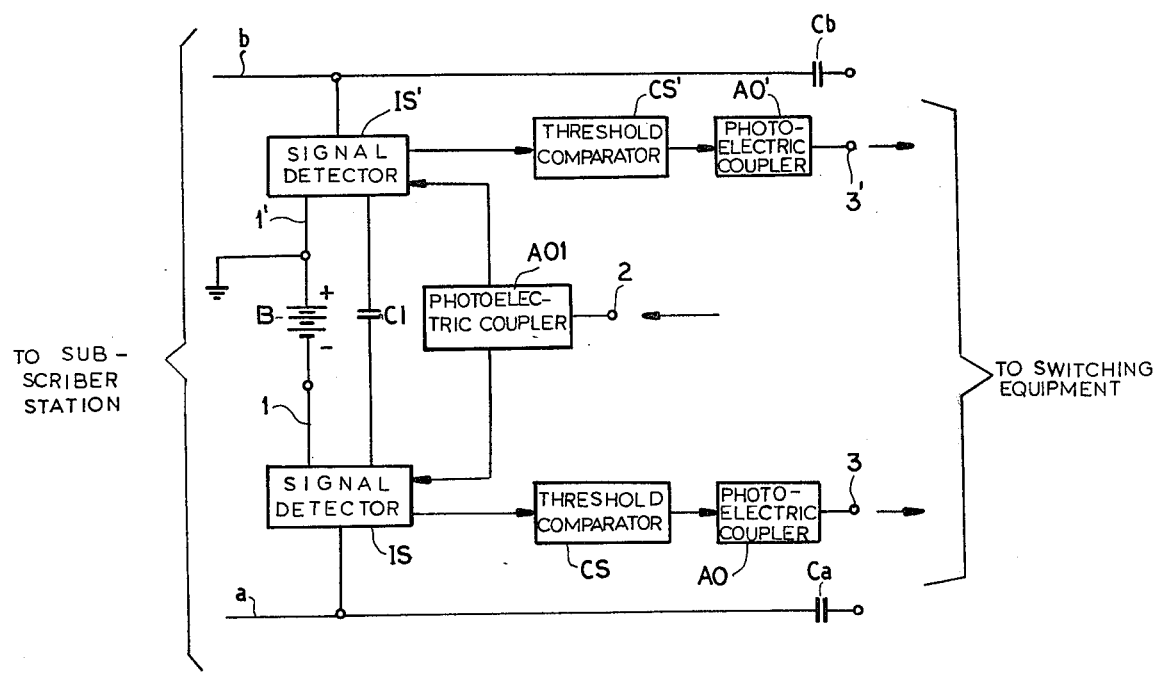
FIG. 1 is a block diagram showing my improved signal-transmitting circuitry.

FIG. 1 shows two talking conductors a and b extending between a central office and a subscriber station to form a line loop. A central battery B has its negative terminal 1 connected to conductor a via a signal detector IS and has its positive terminal 1', assumed to be grounded, connected to conductor b via a signal detector IS'. The flow of direct current from this battery to the selected stages of the central office is prevented by blocking capacitors Ca and Cb respectively inserted in conductors a and b.

Incoming d-c signals, generated in the usual manner by the closing and opening of the line loop at the remote subscriber station, are detected by networks IS and IS'; these networks have a high impedance for voice frequencies and transients so that only legitimate voltage changes of predetermined minimum duration, such as dialing pulses, give rise to significant potential differences at their outputs which extend to respective threshold comparators CS and CS'. The two comparators are essentially bistable so as to be settable and resettable by voltages rising above and falling below respective thresholds which are well separated from each other. The state of each comparator CS and CS' is communicated to the switching equipment of the central office by means of respective photoelectric couplers AO and AO' working into signal lines 3 and 3'. Another signal link 2 carries outgoing signals to be transmitted to the subscriber station, this link terminating at a photoelectric coupler AO1 delivering pulses of opposite polarities to the two signal detectors IS and IS'.

As further shown in FIG. 1, a common capacitor C1 is connected between the two networks IS and IS' for the purpose of compensating rapid current alternations, in and above the voice-frequency range, occurring with relatively inverted phase at the junctions of conductors a and b with the inputs of these networks. It is the presence of this compensating capacitor that, as will become clearer from the following description of FIG. 2, imparts to networks IS and IS' a simulated inductive characteristic. Spurious common-mode pulses propagating cophasally along conductors a and b, however, do not pass through capacitor C1 so as to find a relatively low resistance in networks IS and IS' which shunt them to battery B and ground.

Figure 2:
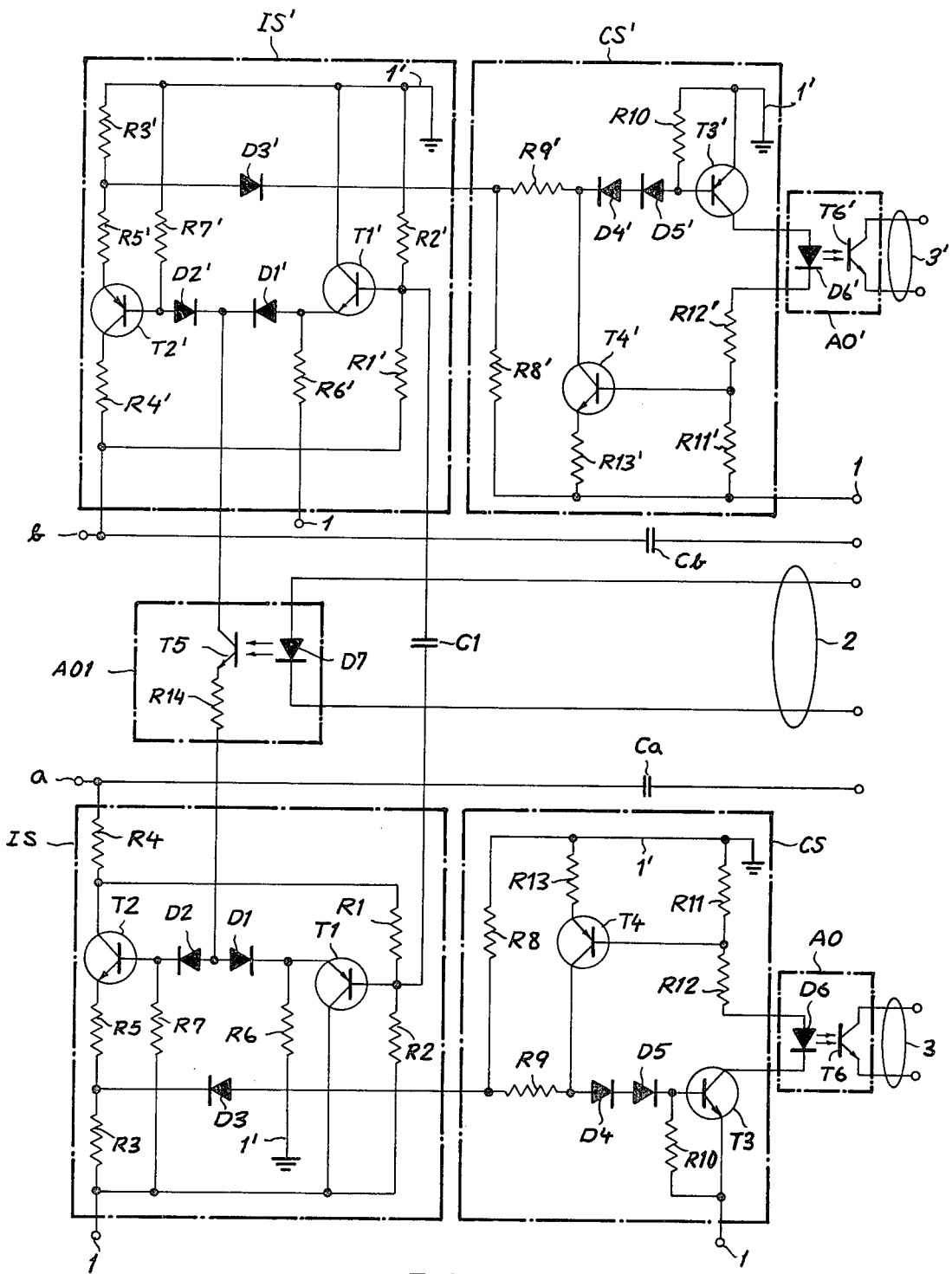
FIG. 2 is a more detailed diagram of the circuitry shown in FIG. 1.

Details of blocks IS, IS', CS, CS', AO, AO' and AO1 are shown in FIG. 2. As will be apparent from this Figure, signal detectors IS and IS' are symmetrically identical with reference to loop a, b except for the polarities of their diodes and transistors; the same is true of threshold comparators CS and CS'. It will therefore be sufficient hereinafter to describe the construction and mode of operation of components IS and CS which are constituted by transistors, diodes and resistors realized in integrated circuitry. Such integration is also possible for the photoelectric couplers AO, AO' and AO1 so that only capacitors Ca, Cb and C1—because of their size—may have to be designed as discrete components.

More particularly, network IS includes a PNP transistor T1 and an NPN transistor T2, three diodes D1, D2 and D3, and seven resistors R1–R7. Comparator CS includes an NPN transistor T3 and a PNP transistor T4, two further diodes D4, D5 and six resistors R8–R13. The associated photoelectric coupler AO comprises a light-emitting diode (LED) D6 juxtaposed with a phototransistor T6 connected across signal link 3; the common photoelectric coupler AO1 comprises a light-emitting diode D7, connected across signal link 2, and a juxtaposed phototransistor T5 whose emitter is connected through a resistor R14 to a junction of the anodes of diodes D1, D2 in network IS and whose collector is connected to the junction of the cathodes of the corresponding diodes D1', D2' in network IS'.

The circuit elements of components IS, CS and AO have counterparts in components IS', CS' and AO' designated by the same reference characters with the addition of a prime mark.

Transistor T1 has its base connected via resistor R1 to the collector of transistor T2 which in turn is connected to conductor a via resistor R4 designed to reduce the emitter/collector voltage of this transistor. The collector of transistor T1 is tied to negative terminal 1 whereas its emitter is connected to ground at terminal 1' via resistor R6 and is further connected to the cathode of diode D1 serving to prevent any reverse biasing of the input circuit of this transistor. Companion diode D2 has its cathode tied to the base of transistor T2 which is connected to negative battery by way of resistor R7; the emiter of transistor T2 is connected to the negative terminal 1 through a voltage divider consisting of resistors R3 and R5 whose junction is connected by way of diode D3 to the junction of resistors R8 and R9 in comparator CS constituting another voltage divider. Transistor T3 has its emitter tied to negative terminal 1 and its collector connected to ground by way of LED D6 and a further voltage divider formed by resistors R11 and R12 whose junction is tied to the base of transistor T4. The base of transistor T3 is connected to its emitter through resistor R10 and, via the stacked diodes D4 and D5, to resistor R9 as well as to the collector of transistor T4 whose emitter is grounded through resistor R13, with voltage divider R8, R9 extending between ground and the collector of transistor T4. Thus, the two complementary transistors T3 and T4 have their bases and collectors cross-connected to form a multivibrator-type bistable circuit.

The impedance stability of network IS depends on the gain of the active element of this network which could be made high through the use of a pair of transistors in Darlington configuration; this, however, would introduce an elevated response threshold on account of the two cascaded base/emitter paths. In the illustrated embodiment, the emitter-follower configuration of transistors T1 and T2 assures a high gain with mutual compensation of their base/emitter voltages to make the response threshold negligible. Similarly, diode D2 compensates for the voltage drop across diode D1 in its conductive state.

A biasing current for the base of main transistors T2 and T2' normally flows from ground terminal 1' through resistor R7', diode D2', phototransistor T5, resistor R14, diode D2 and resistor R7 to negative terminal 1, provided that the phototransistor T5 is sufficiently illuminated by LED D7; part of this current will also pass through ancillary transistor T1, T1' and diodes D1, D1'. The resulting conduction of transistors T2 and T2' connects the line conductors a and b to terminals 1 and 1', respectively. If the hook switch at the subscriber station is closed, direct current will flow from ground terminal 1' via resistors R3'-R5' and transistor T2' to conductor b and from conductor a by way of transistor T2 and resistors R3-R5 to negative terminal 1. In order to signal the subscriber station (e.g. to release the line when the subscriber fails to dial promptly after lifting the receiver, or if excessive leakage losses are detected), the central office interrupts the excitation current for LED D7 passing along link 2 with resulting blocking of the line current.

As long as the line loop is open, the potential of the junction of resistors R3 and R5 differs from that of battery terminal 1 only by a relatively small voltage drop across resistors R3 due to current passing through that resistor from ground termninal 1' by way of resistor R8 and diode D3. Under these conditions the transistor T3 in comparator CS is biased to cutoff whereby LED D6 in coupler AO is de-energized and no current flows in link 3.

When the subscriber closes the line loop, the junction of resistors R3 and R5 goes sufficiently positive to exceed the conduction threshold of transistor T3 defined by the voltage drop across the stacked diodes D4, D5 (which are permanently traversed by current flowing through resistors R8-R10) plus the base/emitter voltage of transistor T3 less the voltage drop across diode D3. The resulting conduction of transistor T3 drives the junction of resistors R11 and R12 more negative whereby transistor T4 is also rendered conductive and further increases the base voltage of transistor T3. The cumulative effect causes both transistors to saturate and flips the bistable circuit of comparator CS into its alternate state in which LED D6 illuminates the phototransistor T6 and lets signal current pass along link 3. This conduction threshold can be easily changed by varying the number of diodes in series with the base of transistor T3 and/or the magnitudes of the associated biasing resistors.

It will be apparent that the saturation of transistors T3 and T4 in the set state of the bistable circuit establishes a different threshold for the resetting of that circuit by a reduction in the voltage drop across resistor R3. When this voltage drop becomes low enough to divert a substantial portion of the saturation current of transistor T4 by way of resistors R9 and R3, transistor T3 begins to desaturate and initiates the cutoff of transistor T4 by a reverse avalanche effect so as to restore the original reset state of the circuit with concurrent termination of current flow in link 3 by coupler AO.

In an analogous manner, components IS' and CS' respond to a closure and an opening of the line loop by turning on and off the current flow in link 3' under the control of photoelectric coupler AO'.

When talking currents are transmitted over the closed line loop, corresponding variations in the collector voltage of transistor T2 are transmitted by voltage divider R1, R2 to the base of transistor T1 but are compensated by voltage variations of opposite phase transmitted to that base from network IS' by way of common capacitor C1. The effect of these voice currents upon the conduction of transistors T2 and T2' is therefore retarded, as with an inductance. Since the capacitor C1 is ungrounded, networks IS and IS' are automatically balanced for alternating current. This contrasts with conventional inductance-simulating circuits in which a capacitor is connected between a conductively biased based and a grounded emitter of a transistor whose collector impedance depends on the gain factor as well as on temperature. In the present instance, the resistive component of the network impedance is determined by the static current/voltage characteristic of main transistor T2 whose slope depends on the magnitudes of the associated biasing resistors.

Common-mode signals arriving cophasally at the terminals of capacitor C1 will not pass through this capacitor whereby transistors T1, T2 and T1', T2' act as two-stage amplifiers shunting these spurious signals to terminals 1 and 1', respectively. Such common-mode signals will rarely if ever have a duration and a magnitude sufficient to trip the threshold comparators CS, CS'; even if this should happen, the switchover would not occur simultaneously in both comparators—as it does in the case of normal signaling—so that the central-office equipment will readily recognize the situation as anomalous.

I claim:

1. In a telephone system including a subscriber station connected to a central office via a line loop with two talking conductors provided with respective blocking capacitors, and signal-transmitting means extending between switching equipment to said central office and points of said talking conductors lying between said blocking capacitors and said subscriber station, the improvement wherein said signal-transmitting means comprises:

two signal-detecting networks constituted by sets of first integrated-circuit compounds including two semiconductor elements connected between respective talking conductors of said line loop and respective terminals of a direct-current source, said semiconductor elements being provided with a common biasing circuit including resistance means connected across said source in series with a light-responsive device;

a common capacitor connected between said signal-detecting networks for compensating voice-frequency currents propagating in opposite directions over said talking conductors;

two threshold comparators constituted by sets of second integrated-circuit components respectively connected to said signal-detecting networks for translating voltage changes of predetermined minimum magnitudes occurring on said talking conductors into incoming d-c signals detectable by said switching equipment;

a light-emitting device juxtaposed with said light-responsive device and controlled by said switching equipment for translating outgoing d-c signals into conductivity changes of said semiconductor elements resulting in voltage changes on said talking conductors detectable at said subscriber station; and individual coupler circuits respectively inserted between said threshold comparators and said switching equipment for transmitting said incoming d-c signals to the latter.

2. The improvement defined in claim 1 wherein said sets of first and second integrated-circuit components are symmetrically disposed with reference to said talking conductors in said signal-detecting networks and in said threshold comparators.

3. The improvement defined in claim 2 wherein said symmetrically disposed sets of first and second components include corresponding transistors of opposite conductivity types.

4. The improvement defined in claim 3 wherein each of said signal-detecting networks comprises a first transistor having a base connected to said common capacitor and to the respective talking conductor of said line loop, an emitter connected to said biasing circuit on a respective side of said light-responsive device and a collector connected to the respective terminal of said source, each of said semiconductor elements being a second transistor having a base connected to said biasing circuit and further having a collector and an emitter inserted between said respective talking conductor and said respective terminal in series with a voltage divider having a tap connected to the associated threshold comparator.

5. The improvement defined in claim 4 wherein said first and second transistors are of opposite conductivity types.

6. The improvement defined in claim 3 wherein each of said threshold comparators comprises a pair of transistors interconnected in a bistable circuit.

7. The improvement defined in claim 6 wherein said pair of transistors have cross-connected collectors and bases and further have respective emitters connected to opposite terminals of said source.

8. The improvement defined in claim 7 wherein the transistors of said pair are of opposite conductivity types.

9. The improvement defined in claim 1, 2, 3, 4, 5, 6, 7 or 8 wherein said individual coupler circuits are constituted by respective photoelectric couplers.

* * * * *